United States Patent
Karaki (10) Patent No.: US 7,616,819 B2
(45) Date of Patent: Nov. 10, 2009

(54) DETECTING DEVICE AND AUTHENTICATION DEVICE

(75) Inventor: Nobuo Karaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 672 days.

(21) Appl. No.: 11/364,001

(22) Filed: Mar. 1, 2006

(65) Prior Publication Data
US 2006/0222218 A1    Oct. 5, 2006

(30) Foreign Application Priority Data
Mar. 29, 2005    (JP) .............................. 2005-094783

(51) Int. Cl.
*G06K 9/68* (2006.01)
(52) U.S. Cl. .................. 382/218; 348/272; 348/294; 348/332; 382/124
(58) Field of Classification Search ................ 348/272, 348/294, 332; 382/124, 218
See application file for complete search history.

(56) References Cited

U.S. PATENT DOCUMENTS

| | | | | |
|---|---|---|---|---|
| 6,660,989 | B2 * | 12/2003 | Guo et al. | 250/208.1 |
| 7,515,183 | B2 * | 4/2009 | Yang et al. | 348/241 |
| 2003/0123714 | A1 * | 7/2003 | O'Gorman et al. | 382/124 |
| 2005/0122764 | A1 * | 6/2005 | Takashima | 365/145 |
| 2006/0227228 | A1 * | 10/2006 | Nam | 348/272 |
| 2008/0259178 | A1 * | 10/2008 | Oike | 348/222.1 |
| 2008/0284876 | A1 * | 11/2008 | Makino | 348/231.99 |

FOREIGN PATENT DOCUMENTS

| JP | A-03-296873 | 12/1991 |
|---|---|---|
| JP | A-2002-259955 | 9/2002 |
| JP | A 2004-3175353 | 11/2004 |

* cited by examiner

*Primary Examiner*—Gregory M Desire
(74) *Attorney, Agent, or Firm*—Oliff & Berridge, PLC (57) ABSTRACT

A detecting device includes: multiple sensors composed with a plurality of sensor circuits arrayed on a plane, each of which generates at least one detected signal that corresponds to a distance from a surface of an object; a selector circuit which selects each of the sensor circuits and outputs the detected signal from each of the sensor circuits; a storage which stores digital data of a reference value; a digital-to-analog converter circuit which generates a reference signal that corresponds to a level of the reference value from the digital data stored in the storage; a generation circuit which generates, per each of the sensor circuits, in sequence, detected data according to a relationship of levels between the detected signal output from each of the sensor circuits selected by the selector circuit, and the reference signal generated by the digital-to-analog converter circuit; an arithmetic circuit which conducts a prescribed operation with a plurality of detected data sets generated by the generation circuit; a refresh circuit which refreshes the digital data stored in the storage, based on an operational value calculated by the arithmetic circuit; and an output circuit which conducts an output process, corresponding to the detected data generated by the generation circuit.

14 Claims, 5 Drawing Sheets

DETECTING DEVICE AND AUTHENTICATION DEVICE

BACKGROUND

1. Technical Field

The present invention relates to a technique for detecting the surface of an object with fine asperity.

2. Related Art

Techniques for detecting a surface of an object with fine asperity, such as a human fingerprint, have been suggested. In JP-A-2004-317353, a detecting device in which multiple sensor circuits are arrayed in matrix along a contact surface of the object is disclosed. Here, each sensor circuit outputs a detection signal that is proportional to the distance between the contact surface and the object close thereto, or in contact therewith. With this structure, a comparator circuit is installed, and by analyzing the data output from the comparator circuit, the surface of the object is identified. Here, the comparator circuit outputs the data sets of two values, in accordance with a relationship between levels of a detection signal output from each sensor and a signal provided externally (hereafter referred to as "reference signals").

However, detecting devices are subject to fluctuations in the electric characteristics (particularly threshold voltages) of the switching element that constitutes part of the device, such as the sensor circuit that generates the detection signals and the comparator circuit that compares the detection signals to the reference signals. Therefore, in order to perform detection evenly for every detecting device, a cumbersome operation is required by the user, including the adjustment of reference signal levels, while confirming the detected results by the detecting device.

SUMMARY

An advantage of the invention is to provide a solution for performing detection evenly without the cumbersome operation of adjusting the reference signals, even though the characteristics of units of the detecting devices are subject to fluctuations.

According to an aspect of the intention, a detecting device includes: multiple sensors composed with a plurality of sensor circuits arrayed on a plane, each of which generates at least one detected signal that corresponds to a distance from a surface of an object; a selector circuit which selects each of the sensor circuits and outputs the detected signal from each of the sensor circuits; a storage which stores digital data of a reference value (for instance, a register 31 in the embodiments); a digital-to-analog converter circuit which generates a reference signal that corresponds to a level of the reference value from the digital data stored in the storage; a generation circuit (for instance, a comparator 35 in the embodiments) which generates, per each of the sensor circuits, in sequence, detected data according to a relationship of levels between the detected signal output from each of the sensor circuits selected by the selector circuit, and the reference signal generated by the digital-to-analog converter circuit; an arithmetic circuit which conducts a prescribed operation with a plurality of detected data sets generated by the generation circuit; a refresh circuit which refreshes the digital data stored in the storage, based on an operational value calculated by the arithmetic circuit; and an output circuit which conducts an output process, corresponding to the detected data generated by the generation circuit.

With this configuration, the digital data of the reference value is refreshed based on the detected data generated from the detected signals that each sensor circuit outputs. Hence, even though characteristics of the units, particularly that of the sensor circuit, the generation circuit, or the D/A conversion circuit are subject to fluctuation among different detecting devices, it is possible to perform the detection evenly and compensate the fluctuation thereof, without requiring a cumbersome operation such as adjustment of the reference value by the user.

Circuits that constitute the detecting device according to the first aspect of the invention, particularly the generation circuit, the arithmetic circuit, the refresh circuit, and the output circuit, are implemented by an arithmetic processing device that executes programs, such as a central processing unit (hereafter "CPU"). This arithmetic processing device may be either one that operates in synchronization with a prescribed clock signal or one that operates asynchronous to the clock signal. Further, each of the circuits in the detecting device may also be implemented by sets of hardware dedicated for each process, such as a digital signal processor (hereafter "DSP").

It is preferable that the detecting device further include a specifying unit which specifies, to the selector circuit, an area which is a target for selection out of the multiple sensors by the selector circuit, and conducts a first process for specifying a first area in the multiple sensors (for instance, a pre-scan process in the embodiments), and a second process for specifying a second area which is larger than the first area (for instance, a main scan process in the embodiments); wherein the selector circuit selects each of the sensor circuits that belong to the area specified by the specifying unit, and lets the detected signal perform output from the sensor circuits; and wherein the output circuit conducts the output process, corresponding to the detected data generated by the generation circuit upon the execution of the second process, while not conducting the output process for the detected data generated by the generation circuit upon the execution of the first process. The example of this aspect of the invention will be described later as a first embodiment.

With the above structure, the reference value is refreshed in accordance with the detected data that corresponds to each sensor circuit in the first area (a target area A1 in the embodiments) that is smaller than the second area (a detection area A0 in the embodiments) specified in the second process. Hence, the load of the arithmetic processing may be reduced, compared to the configuration in which all the sensor circuits are targets in the first process of adjusting the reference value.

Here, the first area specified by the specifying unit in the first process may be selected as a fixed area. However, in a configuration where the specifying unit executes the first process multiple times, the first area specified in one first process (for example, the target area $A1[a]$) may be different from another first area specified in another first process (for example, the target area $A1[b]$).

It is further preferable that, in the detecting device, the arithmetic circuit conduct the prescribed arithmetic operation with the detected data generated by the generation circuit upon the execution of the first process, while not conducting the prescribed arithmetic operation with the detected data generated by the generation circuit upon the execution of the second process. With the above structure, the load of the process by the arithmetic circuit may further be reduced, compared to the configuration in which the arithmetic circuit executes the prescribed arithmetic operation in both the first and the second processes.

It is also preferable that, in the detecting device, the arithmetic circuit conduct the prescribed arithmetic operation with the detected data that corresponds to each of the sensor circuits that belong to a specific area, out of the plurality of detected data sets generated corresponding to the detected signals from the all the sensor circuits that compose the multiple sensors. An example of this aspect of the invention will be described later as a second embodiment. With the above structure, the load of the arithmetic operation by the arithmetic circuit may be reduced, compared to the configuration in which the prescribed arithmetic operation is executed toward the detected data that correspond to all the sensor circuits, since the number of the detected data sets that are the target of arithmetic operation is reduced.

Figure 6:
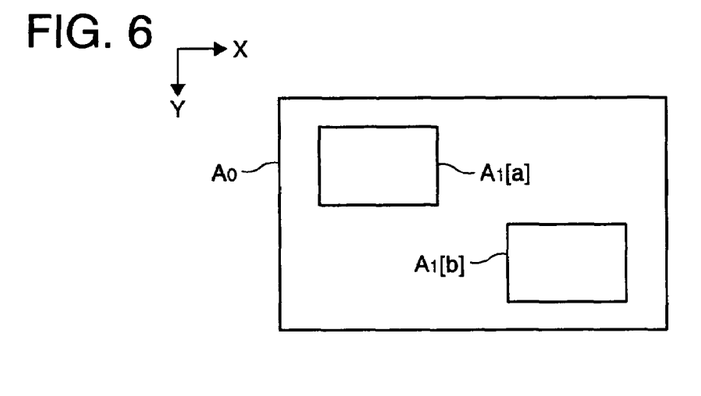
FIG. 6 is a top view drawing illustrating the relation between a detection area and a target area in a modified example.

Here, the first area specified by the specifying unit in the first process may be selected in advance as a fixed area. However, in a configuration where the selector circuit conducts the selection multiple times for all the sensor circuits, or in other words, a configuration in which a scan process of the surface of the object is conducted multiple times, the area selected as the target of the prescribed arithmetic operation by a selection in one of the iterations (for example, the target area A1[$a$] in FIG. 6), may be made different from another area selected as a result of a selection in another iteration (for example, the target area A1[$b$] in FIG. 6).

In this case, the arithmetic circuit calculates a spatial frequency of an image formed with an array of detected data sets that correspond to the sensor circuits, in accordance with an alignment of the sensor circuits in the multiple sensors. Here, the image is a raster image where a first-value detected data represents a black gradation, and a second-value detected data represents a white gradation. The prescribed arithmetic operation is not limited to the above. For instance, each arithmetic circuit may calculate the ratio between the total number of the first-value detected data sets and the total number of the second-value detected data sets, out of the detected data sets generated in accordance with the detected signals from the sensor circuit. This applies in a configuration where the generation circuit generates: if the level of the detected signal is larger than the level of the reference signal, the first-value detected data; and if the level of the detected signal is smaller than the level of the reference signal, the second-value detected data. With this structure, the load of the arithmetic operation by the arithmetic circuit may be reduced, compared to the configuration in which the spatial frequency is computed. Here, in the above structure, "the first value" and "the second value" are specified. However, the number of values that the detected data sets may have is not limited to those two.

According to the above aspect of the invention, the information output by the output circuit is arbitrary. Examples of the configuration may include: one in which the detected data is output outward by the output circuit (the first embodiment described later); one in which the profile data is output outward by the output circuit (as indicated, for instance, in FIG. 8); one in which the correlated value between the profile data generated from the detected data and the pre-registered profile data is output outward from the output circuit (as indicated, for instance, in FIG. 9); and one in which the result of the authentication based on this correlated value is output outward.

The detecting device, according to a second aspect of the invention, is typically used as the means to detect human fingerprints. A detecting device of this kind is preferably utilized for an authentication device that confirms the credentials of a user. This authentication device includes the detecting device, according to the first aspect of the invention, and the authentication section for conducting the authentication process based on the information output from the output circuit of the detecting device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Structure of Detecting Device

Figure 1:
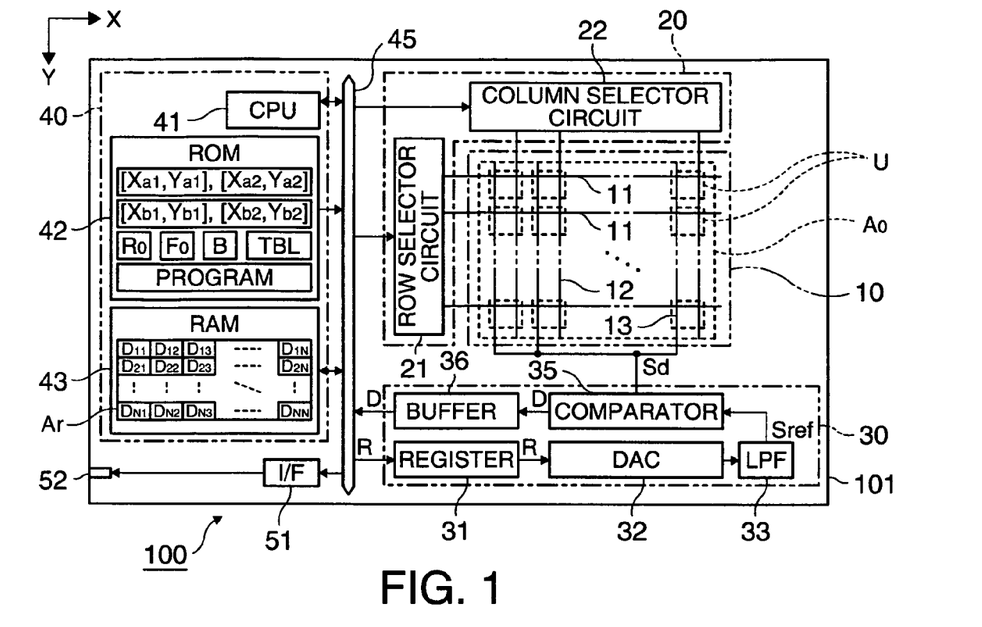
FIG. 1 is a block diagram illustrating a configuration of a detecting device according to a first embodiment of the invention.

FIG. 1 is a block diagram illustrating the configuration of a detecting device according to this embodiment of the invention. A detecting device 100 detects a surface of an object close to or in contact with a surface exposed to the outside (hereafter referred to as "detecting surface"). As shown in FIG. 1, the detecting device 100 includes: multiple sensors 10 composed with a plurality of sensor circuits U arrayed in a matrix within a rectangular area A0 (hereafter "detection area"); a selector circuit 20 for activating each of the sensor circuits U in the multiple sensors 10; a detector circuit 30 that processes a signal Sd output from each of the sensor circuits U (hereafter "detected signal"); a control device 40 that controls the action of each unit in the detecting device 100; and an interface 51 for outputting the results of the detection by the detecting device 100 outward, and an output terminal 52 connected thereto. Each of the parts described above is configured including a switching element formed on the surface of a plate 101. These switching elements are, for instance, thin film transistors provided with a semiconductor layer formed of low temperature polysilicon. The plate 101 may be a system on glass (hereafter "SOG") formed with a hard material such as glass, or a system on plastic (hereafter "SOP") formed with a flexible material such as plastic.

The selector circuit 20, the detector circuit 30, and the interface 51 are connected to the control device 40 through a bus 45. The control device 40 includes a CPU 41 that serves various objectives by running programs, a read only memory (hereafter "ROM") 42 that stores, in a nonvolatile manner, programs that the CPU 41 runs or various types of data used upon running these programs, and a random access memory (hereafter "RAM") 43 used as a work area by the CPU 41.

In the detection area A0, M row lines 11 extended in the direction of the X-axis, N column lines 12 extended in the direction of the Y-axis orthogonal to the X-axis, and N output lines 13 extended to the direction of the Y-axis so as to make a pair with each of the column lines 12, and connected to the detector circuit 30, are formed (M and N are positive integers). Each sensor circuit U in the multiple sensors 10 is arranged corresponding to the cross point of the row line 11 and the column line 12. Therefore, these sensor circuits U are arrayed in a matrix of M by N, where M represents the number of rows extended in the direction of the X-axis and N represents the number of columns extended in the direction of the Y-axis. Each sensor circuit U generates the detection signal Sd that has a level that is proportional to the distance between the detecting surface and the object close thereto or in contact therewith. The N output lines 13 are connected together to an input terminal of the comparator 35 in the detector circuit 30.

Figure 2:
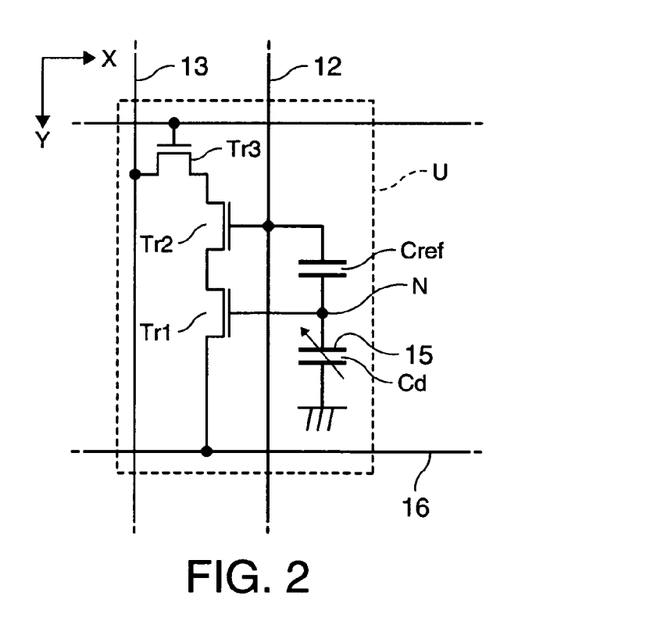
FIG. 2 is a circuit diagram illustrating a configuration of one of the sensor circuits.

FIG. 2 is a circuit diagram illustrating the configuration of one of the sensor circuits. A detection electrode 15 illustrated in the figure is a conductive film arrayed in parallel to the detecting surface, and its surface is covered with a dielectric substance (not shown). The detection electrode 15 faces the surface of the object approaching toward the detecting surface, sandwiching the dielectric substance. As a result, a detection capacitor Cd is configured with the dielectric substance sandwiched between the detection electrode 15 and the object. The capacitance of this detection capacitor Cd deviates proportionally to the distance between the detection electrode 15 and the surface of the object. A reference capacitor Cref is a capacitor composed with: an electrode that is connected to the detection electrode 15 at the connecting point N, and another electrode that is connected to the column line 12, facing each other. The potential of the connecting point N is equal to the one in which the potential difference between the object and the column line 12 is divided in accordance with a proportion between the reference capacitor Cref and the detection capacitor Cd.

A gate electrode of an amplifying transistor Tr1 is connected to the connecting point N. This amplifying transistor Tr1 is a switching element that amplifies the deviation of the potential at the connecting point N, so as to generate the detected signal Sd, and a source electrode thereof is connected to a power source line 16 to which the lower potential of the power source is supplied. A drain electrode of the amplifying transistor Tr1 is connected to the source electrode of a column-selecting transistor Tr2. This column-selecting transistor Tr2 is a switching element, where the gate electrode thereof is connected to the column line 12 and the drain electrode thereof is connected to the source electrode of a row-selecting transistor Tr3. The gate electrode of the row-selecting transistor Tr3 is connected to the row line 11, and the drain electrode thereof is connected to the output line 13.

The selector circuit 20 shown in FIG. 1 is a means to select each of the sensor circuits U in the multiple sensors 10, and to output the detected signal Sd from each sensor circuit U to the output line 13. It includes the row selector circuit 21 connected to each of the M row lines 11 and the column selector circuit 22 connected to each of the N column lines 12. The row selector circuit 21 selects one of the row lines 11 under the control of the CPU 41, and applies the potential that switches on the row-selecting transistor Tr3 to the selected row line 11, while applying the potential that switches off the row-selecting transistors Tr3, to the rest of the row lines 11. The column selector circuit 22 selects one of the column lines 12 under the control of the CPU 41, and applies the potential that switches on the column-selecting transistor Tr2 to the selected column line 12, while applying the potential that switches off the column-selecting transistors Tr2, to the rest of the row lines 12. With the above structure, the detected signals Sd generated by the sensor circuits U, which correspond to the cross points of the row lines 11 and the column lines 12, are sequentially output to the output lines 13. The detected signals Sd input to the detector circuit 30 from the multiple sensors 10 deviate, as needed, to the level corresponding to the capacitance of the detection capacitor Cd in each of the sensor circuits U in synchronization with the frequencies in which each of the sensor circuits U are selected by the selector circuit 20. In other words, they change to the level that corresponds to the distance between the detection electrode 15 in each of the sensor circuits U and the object that faces thereto. Here, in this exemplary structure, each of the sensor circuits U are sequentially selected by dots, while other structures may also be included, such as "selection by line", in which the sensor circuits U are selected by a row of the multiple sensors 10, or "selection by area", in which all the sensor circuits U of the multiple sensors 10 are simultaneously selected. Hereafter, an operation to sequentially select each of the sensor circuits U with the selector circuit 20 is noted as "scan".

The configuration of the detector circuit 30 will now be described. The comparator 35 shown in FIG. 1 compares the level of the reference signal Sref to the level of the detected signal Sd that is supplied in sequence from each of the sensor circuits U in the multiple sensors 10, and generates 1-bit data D (hereafter referred to as "detected data") that corresponds to the comparison result for every sensor circuit U. Specifically, the comparator 35 outputs a value "1" as the detected data D if the level of the detected signal Sd is higher than that of the reference signal Sref, while it outputs a value "0" as the detected data D if the level of the detected signal Sd is lower than that of the reference signal Sref. The detected data D generated in sequence for every sensor circuits U is stored in a buffer 36. Thereafter, the detected data D stored in the buffer 36 is sequentially read out by the CPU 41 and stored to the RAM 43. In this RAM 43, a storage area Ar of M*N bits, in which the detected data D which corresponds to the sensor circuits U that are arrayed on M vertical rows by N horizontal columns is stored in the order of their original alignment, is set.

The register 31, a D/A converter circuit ("DAC" in FIG. 1) 32, and a low-pass filter ("LPF" in FIG. 1) 33, all of which are shown in FIG. 1, generate the reference signal Sref supplied to the comparator 35. The register 31 stores digital data that represents the level (hereafter referred to as "reference value") R of the reference signal Sref. The D/A converter circuit 32 generates the reference signal Sref, which is an analog signal, where the level thereof corresponds to the reference value R stored in the register 31. The reference signal Sref output from this D/A converter circuit 32 is supplied to the comparator 35, after a high-frequency component, for instance, a noise component, being removed by the low-pass filter 33. This low-pass filter 33 may be omitted if the noise of the reference signal Sref output from the D/A converter circuit 32 is not a problem.

Figure 3:
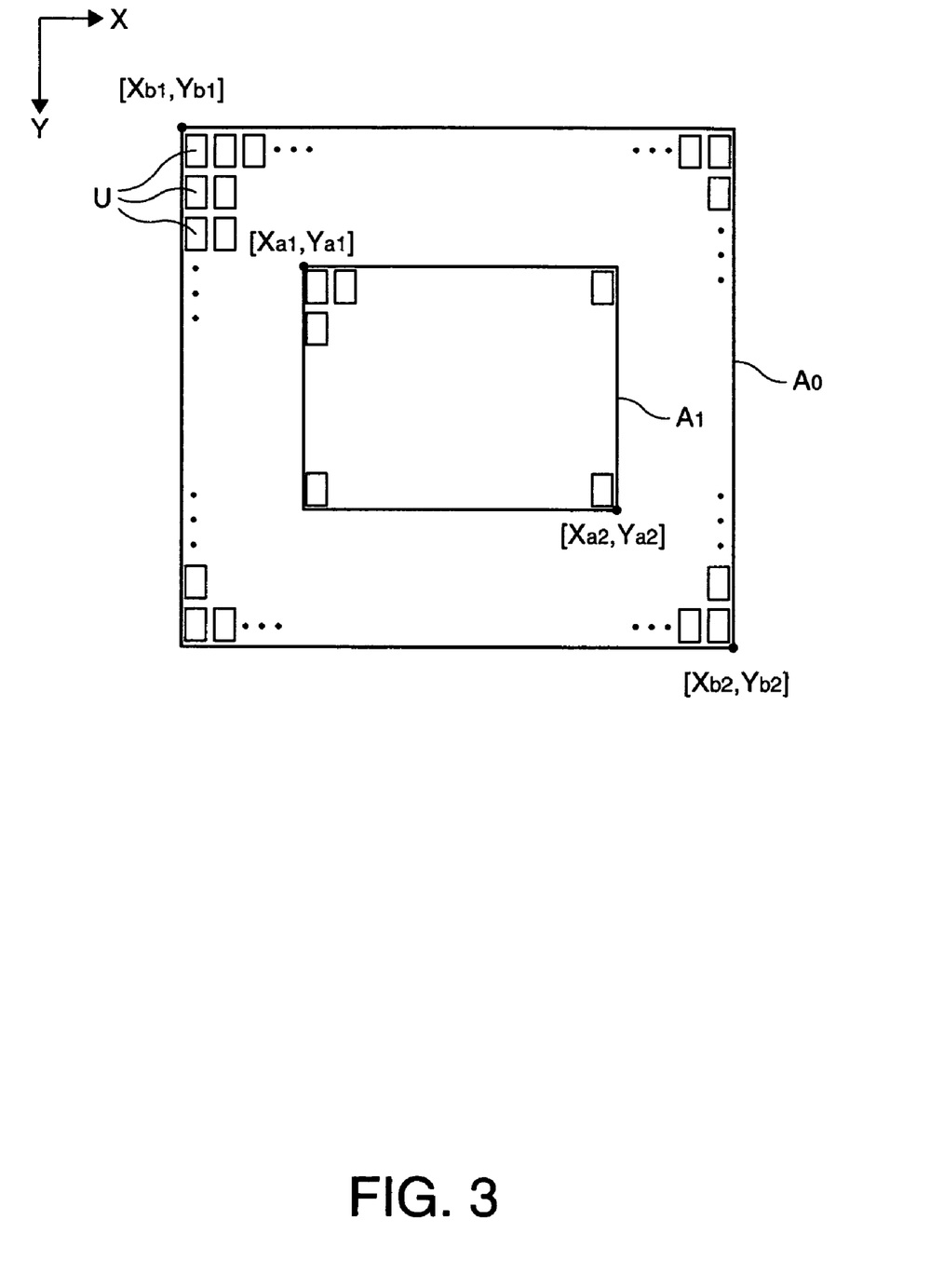
FIG. 3 is a top view drawing describing a target area.

There are a pre-scan process and a main scan process for the scanning of the sensor circuits U that are executed in this embodiment. The pre-scan process selectively scans each of the sensor circuits U that belong to a specific area (hereafter referred to "target area") A1 within the detection area A0 which includes all the sensor circuits U, as shown in FIG. 3, and obtains respective detected data D that corresponds to each sensor circuit U. In contrast, the main scan process scans all the sensor circuits U that belong to the detection area A0, and obtains the detected data D (M*N bits) that corresponds to each sensor circuit U.

The pre-scan process is executed in order to adjust the level of the reference signal Sref generated by the D/A converter circuit 32. More specifically, in this embodiment, the reference value R stored in the register 31 is refreshed based on the detected data D generated in the pre-scan process; thus adjusting the level of the reference signal Sref. By executing the pre-scan process prior to the main scan, the reference signal Sref that is used in the main scan process may be adjusted to the level corresponding to the characteristics of the detecting device 100, to, for instance, the threshold voltage level of the thin film transistor that constitutes each part. Since the pre-scan process is executed in order to adjust the level of the reference signal Sref in this embodiment, the detected data D obtained in this pre-scan process is not used for identifying the shape of the surface of the object. In contrast, the detected data D that corresponds to all the sensor circuits U, obtained in the main scan process, is output outward from the output terminal 52 through the interface 51. The surface of the object is identified by analyzing the detected data D output in this manner.

As shown in FIG. 1, the ROM 42 is stored with programs for executing the above-described pre-scan process and main scan process, as well as with various data sets that are used upon executing these programs. Examples of data sets stored in the ROM 42, as shown in FIG. 3, include: coordinates ([Xa1, Ya1] and [Xa2, Ya2]) representing diagonal points of the target area A1; coordinates ([Xb1, Yb1] and [Xb2, Yb2]) representing diagonal points of the detection area A0 that serves as a target of the main scan; data that indicates an initial value R0 of the reference value R; and a table TBL for specifying a correction value A of the reference value R in the register 31, based on the results of the pre-scan process. The details of the storage contents in the ROM 42 are described along the explanation of the operation of the detecting device 100.

Operation of Detecting Device 100

Figure 4:
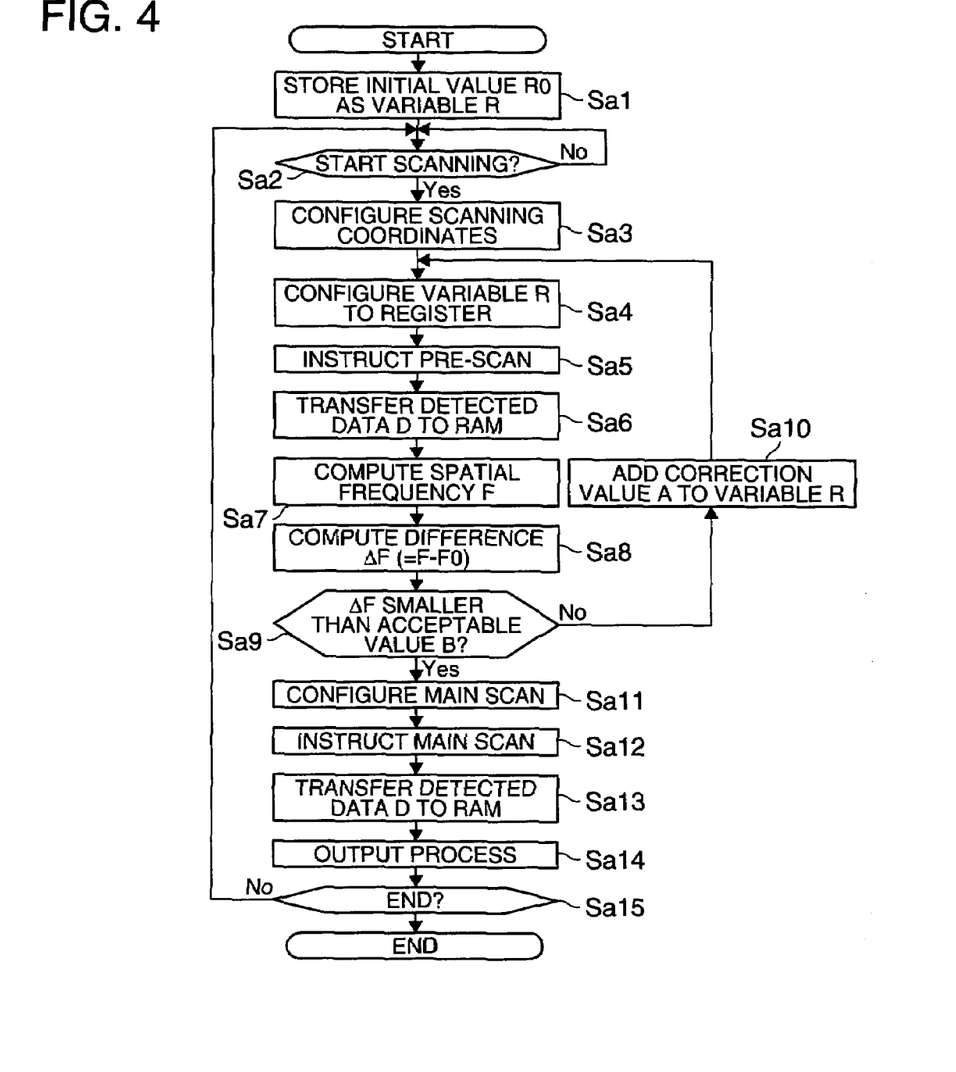
FIG. 4 is a flow chart illustrating the steps of a program run by a CPU.

Once an operation toward an input device (not shown) instructs the start of a program, the CPU 41 reads-in the program from the ROM 42 to the RAM 43, and sequentially executes the steps therein. FIG. 4 is a flow chart showing the steps of the program.

As shown in FIG. 4, the CPU 41 stores the initial value R0 that indicates the level of the reference signal Sref stored in the ROM 42 as a variable R in the RAM 43 (step Sa1), and thereafter, stands by until a timing to start scanning comes (step Sa2). In the step Sa2, the CPU 41 decides that the timing has come to start scanning, if, for instance, the instruction to start scanning is input from an external apparatus, corresponding to the operation toward the input device (not shown), or the approach of the object toward the detecting surface is detected by the prescribed sensor.

If the timing for starting the scan comes, the CPU 41 stores the coordinates of the target area A1 that is stored in the ROM 42 to the RAM 43 (step Sa3). Thereafter, the CPU 41 configures the variable R stored at this point in the RAM 43, to the register 31 (step Sa4). Consequently, the reference signal Sref, input into the comparator 35 through the low-pass filter 33 from the D/A converter circuit 32, reaches to the level corresponding to the variable R.

Subsequently, the CPU 41 outputs the coordinates of the target area A1 stored in the RAM 43 in the step Sa3 to the selector circuit 20, thereby letting the selector circuit 20 to execute the pre-scan process (step Sa5). The row selector circuit 21 sequentially selects each of the row lines 11 that belong to the area specified by the CPU 41, between the coordinate "Ya1" and the coordinate "Ya2" inclusive. The column selector circuit 22 also sequentially selects each of the column lines 12 that belong to the area specified by the CPU 41, between the coordinate "Xa1" and the coordinate "Xa2", within each period during which the row selector circuit 21 selects one row line 11. As a result, the detected signals Sd generated by the sensor circuits U in the target area A1 are supplied sequentially to the comparator 35. Thereafter, the comparator 35 generates sets of the detected data D, in accordance with the relationship between the levels of the reference signal Sref supplied from the low-pass filter 33 and the detected signal Sd, and sequentially outputs sets of the detected data D to the buffer 36. The CPU 41 thereby reads-out the detected data D stored in the buffer 36 to the storage area Ar in the RAM 43 (step Sa6).

Once the extraction of the detected data D is completed for all the sensor circuits U that are grouped under the target area A1, the CPU 41 computes a spatial frequency F by an execution of the prescribed arithmetic operation with the detected data D in the target area A1, transferred to the RAM 43 in the step Sa6 (step Sa7). Specifically, the CPU 41 computes the spatial frequency F of an image composed with the sets of detected data D that correspond to of the sensor circuits U grouped under the target area A1, the detected data D being arrayed according to their alignment. In the image, in other words, the detected data D "1" is set to a black pixel and the detected data D "0" is set to a white pixel.

As shown in FIG. 1, an optimal value F0 for the spatial frequency F is stored in advance in the ROM 42. The CPU 41 computes the difference ΔF between the spatial frequency F computed in the step Sa7 and the optimal value F0 stored in the ROM 42 (step Sa8). An acceptable value B of this difference ΔF is stored in the ROM 42 in advance. The CPU 41 determines whether or not the difference ΔF computed in the step Sa8 is smaller than the acceptable value B stored in the ROM 42 (step Sa9). In other words, the CPU 41 determines, in the steps Sa8 and Sa9, whether or not the spatial frequency F, computed based on the detected data D obtained from each of the sensor circuits U in the target area A1, is within the prescribed range that includes the optimal value F0.

Figure 5:
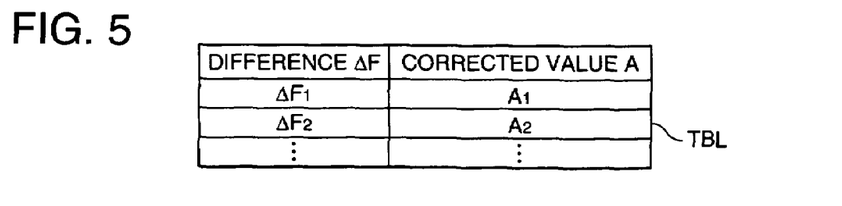
FIG. 5 is an explanatory drawing illustrating the contents of a table for computing a corrected value.

Here, if the difference in the value between the level of the reference signal Sref actually generated by the D/A converter circuit 32 and the level of the reference signal Sref that matches the characteristics of the detecting device 100 is further, then the value of the difference ΔF between the spatial frequency F and the optimal value F0, computed in the step Sa7, is larger. If the CPU 41 decides that the difference ΔF is larger than the acceptable value B in the step Sa9, then it executes a process to refresh the variable R stored in the RAM 43 (Step Sa10). That is to say, the CPU 41 selects the corrected value A that corresponds to the difference ΔF by referring to the table TBL stored in the ROM 42. Thereafter, it adds the corrected value A to the variable R stored in the RAM 43. As shown in FIG. 5, the table TBL includes the difference ΔF and the corrected value A, corresponding to each other. In the step Sa10, the CPU 41 searches the difference ΔF computed in the step Sa8 from the table TBL, and identifies the corrected value A that corresponds to the found difference ΔF as a value that needs to be added to the variable R. Consequently, by executing the above processes, the CPU 41 moves the process back to the step Sa4 and configures a new variable R to the register 31. As a result, the reference signal Sref supplied to the comparator 35 from the D/A converter circuit 32 is adjusted to the level that corresponds to a new variable R after the refresh in the step Sa10. The processes from the step Sa4 to the step Sa10 are repeated until the difference ΔF becomes smaller than the acceptable value B.

If the CPU 41 decides that the difference ΔF is smaller than the acceptable value B in the step Sa9, then it controls parts so as for the main scan process, targeting the entire detection area A0, to be executed. In other words, the CPU 41 stores the coordinates of the detection area A0 stored in the ROM 42 to the RAM 43 (step Sa11), and thereafter, it lets the selector circuit 20 executed the main scan process by specifying these coordinates (step Sa12). The row selector circuit 21 sequentially selects each of the row lines 11 that are between the coordinate "Yb1" (the first row) and the coordinate "Yb2" (the Mth row), inclusive, both of the coordinates being specified by the CPU 41. The column selector circuit 22 sequentially selects each of the column lines 12 that are between the coordinate "Xb1" (the first column) and the coordinate "Xb2" (the Nth column), inclusive, both of the coordinates being specified by the CPU 41, every time one row line 11 is selected. As a result, the detected signals Sd generated in all the sensor circuits U in multiple sensors 10 are sequentially supplied to the comparator 35, and the sets of detected data D corresponding to them are generated by the comparator 35 and are stored in the buffer 36. The CPU 41 thereby sequentially transfers the sets of detected data D (M*N bits) stored in the buffer 36 to the storage area Ar in the RAM 43 (step Sa13).

Once the main scan process is completed with the above-mentioned steps, the CPU 41 sequentially outputs the M*N bits of detected data D sets stored, in the step Sa13, in the storage area Ar in the RAM 43, from the interface 51 to the output terminal 52. The external apparatus connected to the output terminal 52 receives in sequence the detected data D sets from the detecting device 100, and identifies the surface of the object by analyzing these detected data D sets.

Moreover, the CPU 41 decides whether or not the program should be ended (Sa15). For instance, the CPU 41 decides in the step Sa15 an option "Yes" if the instruction to end scanning is input in accordance with the operation toward the input device (not shown). When determined as "Yes", the CPU 41 ends the execution of the program. If the CPU 41 decides that the program should not be ended (an option "No" in the step Sa15), it moves the process back to the step Sa2 and stands by until the next scan start timing comes again (for instance, another object different from that of the former scanning becomes the target of the detection).

As described above, in this embodiment, the reference signal Sref is adjusted to the level that matches the characteristics of the detecting device 100, based on the results of the pre-scan process. Therefore, it is possible to perform the detection evenly, even there are individual difference in electrical characteristic for every detecting device 100, compensating the effect of the individual difference. Further, with this structure, there is not need for the user to conduct a cumbersome operation such as adjustment of the level of the reference signal Sref.

Moreover, in this embodiment, since the detecting device 100's parts are configured with thin film transistors formed on the surface of the plate 101, the device may be made smaller. Therefore, the detecting device 100 in this embodiment is particularly suitable for mobile apparatuses such as a mobile phone or a card shaped apparatus that are carried around by the user. These type of thin film transistors, particularly the transistors using low-temperature polysilicon as a semiconductor layer, involves problems that they are inferior in performance (particularly in electron mobility) as switching elements, when compared to so-called bulk transistors, and that their characteristics are subject to much fluctuation. In consideration of the aforementioned problems, this embodiment, which allows compensation of fluctuation in electric characteristics of the units, is particularly effective in the structure in which the thin film transistors are utilized as the switching elements, as indicated in FIG. 1.

Further, in this embodiment, the detected data D that serves as a reference for determining the level of the reference signal Sref is extracted, by the pre-scan process performed in the target area A1 that is smaller than the detection area A0. Hence, compared to the configuration in which the process that targets the entire detection area A0 in the pre-scan process is conducted, the time required for the pre-scan process may be shortened, and the load of process to compute the spatial frequency F from the detected data D may be reduced.

Additional Exemplary Embodiments

In the first embodiment, additional exemplary embodiments described below may also be employed.

1. In the first embodiment, the target area A1 in which the pre-scan process is performed is smaller than the detection area A0. However, if there is enough processing capacity in the CPU 41, the pre-scan process may be performed on the entire detection area A0, for extracting the detected data D.

2. In the exemplary structure of the first embodiment, the target area A1, selected in advance as a fixed area, becomes the target of the pre-scan process. However, this target area for the pre-scan process may also be modified arbitrarily. In this structure, the coordinates of the diagonal points for a plurality of areas with different status (locations and shapes) are stored in the ROM 42 in advance, and the CPU 41 executes the pre-scan process after selecting one of these areas as a target area A1. For example, in one iteration, the CPU 41 controls each part so that the pre-scan process is executed having the target area A1[a] indicated in FIG. 6 as a target, while in the pre-scan process in other iteration, it controls each part so that the pre-scan process is executed having the target area A1[b] indicated in FIG. 6 as a target. With this structure, the level of the reference signal Sref can be adjusted, so that, even in the case where the fluctuation in characteristics of the sensor circuits U within the specified area in the detection area A0, the fluctuation thereof may be compensated.

3. In the exemplary structure of the first embodiment, the pre-scan process is executed immediately before the main scan process every time the main scan process is performed. However, the relationships between the main scan process and the pre-scan process is not limited to the above. Examples thereof include: a structure in which one pre-scan process is executed every time several main scan process is executed; and a structure in which only one pre-scan process is executed before the shipping of detecting device 100. Yet, if the pre-scan process may be arbitrarily executed after the shipping of the detecting device 100, as in the first embodiment, then, in the case where the characteristics of each part in the detecting device 100 has changed in the duration of time, the reference signal Sref may be adjusted to the level that matches the characteristics after the change.

4. In the exemplary structure of the first embodiment, the pre-scan process and the variable R are repeatedly refreshed until the difference ΔF reaches below the acceptable value B. However, a structure, in which the variable R (or the reference value R stored in the register 31) is corrected only once, if the difference ΔF is below the acceptable value B in the step Sa9, may also be included.

Second Embodiment

A second embodiment according to the present invention will now be described. In the exemplary structure of the first embodiment, the pre-scan process for adjusting the reference signal Sref is performed as a different process from the main scan processing (in other words, the process to extract the detected data D that is an output target outward). In contrast, in this embodiment, the level of the reference signal Sref used in the next main scan process is adjusted, based on the detected data D extracted in the main scan process previous to that next main scan process. In this second embodiment, the same signs and numerals are used for the same elements as in the first embodiment, and the description thereof is omitted.

Operation of Detecting Device 100

Figure 7:
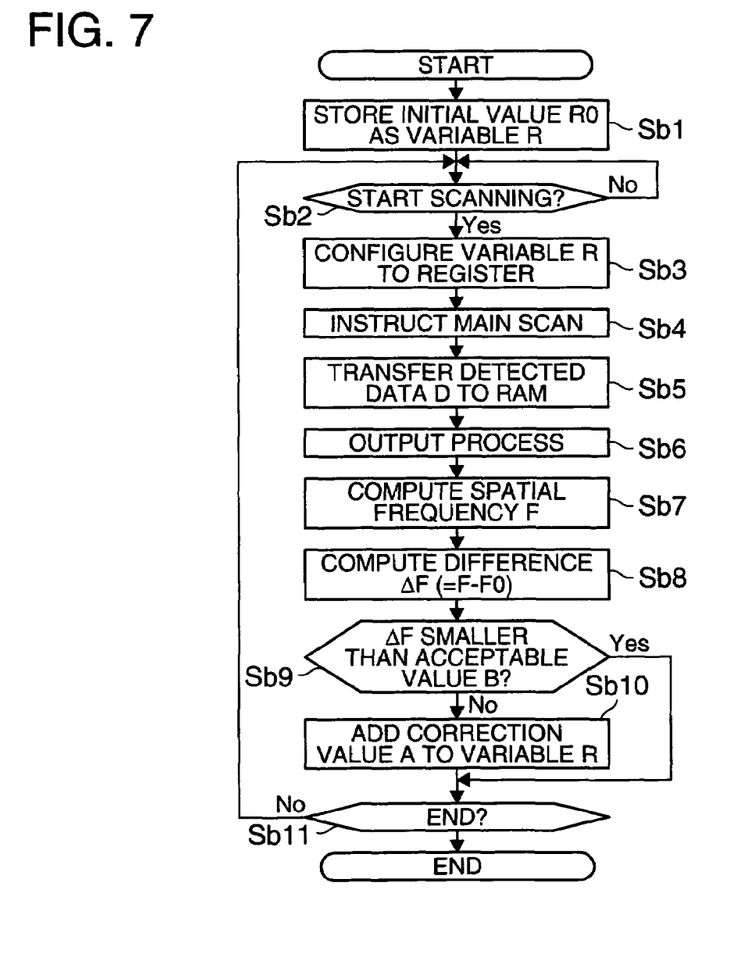
FIG. 7 is a flow chart illustrating the steps of a program run by a CPU, according to a second embodiment of the invention.

FIG. 7 is a flow chart illustrating the steps of a program run by a CPU, according to this second embodiment of the invention. As shown in FIG. 7, the CPU 41 stores the initial value R0 stored in the ROM 42 as the variable R in the RAM 43 (step Sb1), similar to the steps Sa1 and Sa2 in FIG. 4, and thereafter, stands by until a timing to start scanning comes (step Sb2). When the timing comes to start scanning, the CPU 41 configures the variable R stored in the RAM 43 as the reference value R to the register 31 (step Sb3).

Subsequently, the CPU 41 instructs the execution of the main scan to the selector circuit 20, in the similar procedure described in the step Sa12 in FIG. 4 (step Sb4). Thereafter, the CPU 41 sequentially transfers the sets of detected data D stored in the buffer 36 as a result of the main scan process, to the storage area Ar in the RAM 43 (step Sb5). Hence, M*N bits of detected data D sets that correspond to all the sensor circuits U are stored in the storage area Ar, in accordance with their original alignment. Then, the CPU 41 sequentially reads out these detected data D sets, and outputs them to the selector circuit 52, in the similar procedure described in the step Sa14 in FIG. 4 (step Sb6).

Subsequently, the CPU 41 computes the spatial frequency F with the sets of detected data D which correspond to sensor circuits U grouped under the target area A1, out of the all the sets of detected data D stored in the RAM 43 in the step Sb5 (step Sb7). The sets of detected data D that belong to the target area A1 is identified from the coordinates of the target area A1 stored in the ROM 42. The CPU 41, after computing the difference ΔF between the spatial frequency F computed in the step Sb7 and the optimal value F0 stored in the ROM 42 (step Sb8), decides whether or not the difference ΔF is smaller than the acceptable value B stored in the ROM 42 (step Sb9). If the difference ΔF is identified to be larger than the acceptable value B (in other words, if the reference signal Sref is at the level that does not suit the characteristics of the detecting device 100), the CPU 41 adds the corrected value A, specified in the table TBL in accordance with the difference ΔF, to the variable R in the RAM 43, in the similar procedure described the step Sa10 in FIG. 4 (step Sb10). In contrast, if the difference ΔF is identified to be smaller than the acceptable value B (in other words, if the level of the reference signal Sref is within the prescribed range including the optimal level), the CPU 41 moves the process to the step Sb11, without going through the step Sb10.

The CPU 41 decides whether or not the program should be ended, similar to the step Sa15 in FIG. 4 (step Sb11). If the CPU 41 decides not to end the program yet in the step Sb11, it moves the process to the step Sb2. Even in the case where the level of the reference signal Sref in the previous main scan process is not appropriate, since the variable R is corrected in the step Sb10, the detected data D may be obtained in the main scan that follows immediately after the previous main scan, based on the more appropriate level of reference signal Sref than the one during the previous main scan process.

As described above, in this second embodiment, the level of the reference signal Sref is adjusted based on the detection results immediately before the current one; hence the similar effect as that of the first embodiment is obtained. In addition, in this embodiment, there is an advantage of being able to reduce the processing load of the CPU 41, compared to the configuration in the first embodiment where the pre-scan process is required in addition to the main scan process. This is because in the second embodiment, only one main scan process needs to be executed in order to obtain the detected data D for the object.

Additional Exemplary Embodiments

In the second embodiment, additional exemplary embodiments described below may also be employed.

1. In the exemplary structures of the second embodiment, the spatial frequency F is computed based on the detected data D that corresponds to the A1 which is smaller than the detection area A0. However, a structure, in which the spatial frequency F is computed by executing the prescribed arithmetic operation with the M*N bits of detected data D that corresponds to the entire detection area A0, may also be included.

2. In the exemplary structures of the second embodiment, the target area A1, selected in advance as a fixed area, becomes the target for computing the spatial frequency F. However, this target area for the spatial frequency F computation may also be modified arbitrarily. Specifically, with the structure that the coordinates of the diagonal points for a plurality of areas with different status (locations and shapes) are stored in the ROM 42 in advance, and the CPU 41 computes, in the step Sb7, the spatial frequency F after selecting one of these areas as a target area A1. For instance, the CPU 41 computes the spatial frequency F with the sets of detected data D of the target area A1[*a*] in FIG. 6, in the step Sb7 for executing the main scan for one iteration. At the same time, in the step Sb7 for executing the main scan for other iteration, it also computes the spatial frequency F with the sets of detected data D of the target area A1[*b*].

3. In the exemplary structures of the second embodiment, the computation of the spatial frequency F and the refreshing of variable R based on the computation thereof, are executed every time the main scan process is executed. However, a structure in which these processes are executed only once for one main scan process out of many, may also be included. Here, the order of the processes for outputting the detected data D and refreshing the variable R is arbitral. For instance, the output process of the step Sb6 may be executed after the execution of any of the steps from Sb7 to Sb10.

MODIFIED EXAMPLES

Various modifications may be made to each of the embodiments. Exemplary modifications are described in detail below. Each of the exemplary modifications may be arbitrarily combined.

First Modified Example

The steps of the output process is not limited to the one in the exemplary structures of the embodiments, where the detected data D is output outward from the output terminal 52 in the output process of the step Sa14 in FIG. 4 or the step Sb6 in FIG. 7. Examples of the output process may include the steps described below.

First Exemplary Modification

Figure 8:
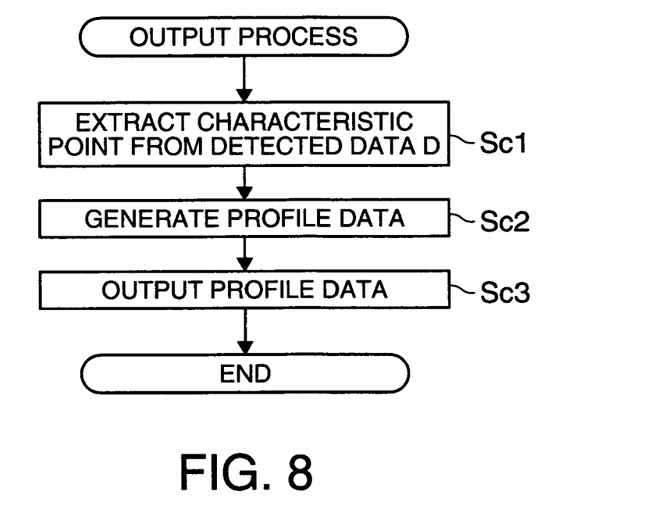
FIG. 8 is a flow chart illustrating another embodiment of the output process.

As shown in FIG. 8, when the output process starts in the step Sa14 in FIG. 4 or in the step Sb6 in FIG. 7, the CPU 41 extracts parts that are characteristic when identifying the shape of the object's surface (hereafter referred to as "characteristic point"), based on the detected data D stored, at the start of the process, in the storage area Ar of the RAM 43 (step Sc1). This characteristic point is, for instance, a branching point or an end point of a fingerprint of human hand. Thereafter, the CPU 41 generates data which expresses the location of the characteristic points extracted in the step Sc1 and the shapes formed with the characteristic points, in vectors (hereafter referred to as "profile data") (step Sc2). Subsequently, the CPU 41 outputs this profile data outward from the interface 51 and the output terminal 52 (step Sc3).

Second Exemplary Modification

Figure 9:
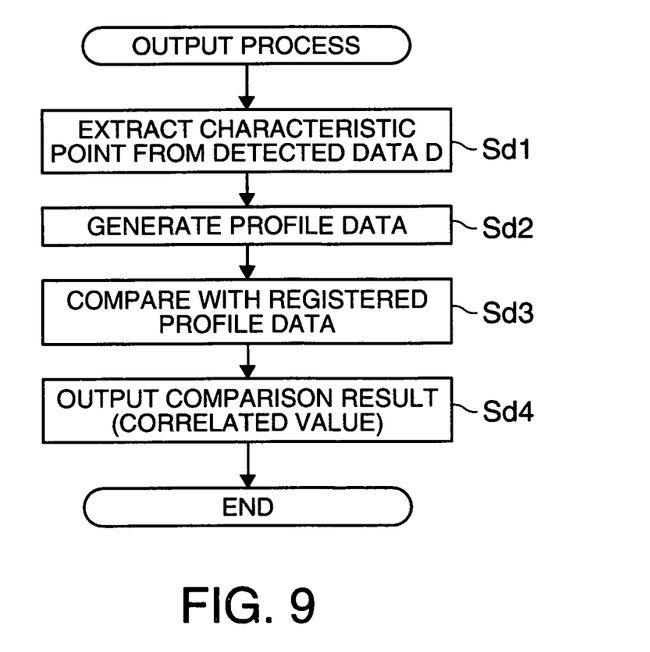
FIG. 9 is a flow chart illustrating another embodiment of the output process.

In this exemplary modification, the profile data extracted from the shape of the surface of the particular object (for instance, a fingerprints' shape of a user or an owner of the detecting device 100), hereafter referred to as "registered profile data", is stored in advance in the ROM 42. As shown in FIG. 9, when the output process starts, the CPU 41 generates the profile data of the object which is actually set as a detection target at the time of the start, in similar steps as that of the steps Sc1 and Sc2 in FIG. 8 (step Sd1 and step Sd2). Thereafter, the CPU 41 computes the correlation value (a value that indicates the degree of similarity) between the profile data generated in the step Sd2 and the registered profile data stored in the ROM 42, by comparing them (step Sd3), and subsequently outputs the correlated value outward from the interface 51 and the output terminal 52 (step Sd4).

Third Exemplary Modification

In this exemplary modification, threshold values of the correlation values are stored in the ROM 42 in advance. After computing the correlation value in the steps Sd1 through Sd4 in FIG. 9, the CPU 41 compares the computed correlation value to another correlation value stored in the ROM 42, and outputs the data that expresses the comparison results (for instance, data that indicates the existence of correlation) outward from the interface 51 and the output terminal 52.

Second Modified Example

In the exemplary structures of the embodiments, the spatial frequency F that corresponds to the detected data D is calculated in the step Sa7 in FIG. 4 or the step Sb7 in FIG. 7. However, the arithmetic operation executed here may be modified arbitrarily. For example, a ratio between different data sets, out of the detected data D that correspond to the plurality of sensor circuits U grouped under the target area A1, may also be computed. Specifically, the different data sets include: the total number of data sets with the value "1" (the total number of black pixels in the image formed with an array of detected data D sets); and the total number of data sets with the value "0" (the total number of white pixels in the image formed with an array of detected data D sets). With this structure, the load of the arithmetic operation may be reduced, compared to the configuration in which the computation of the spatial frequency F is performed, as in the embodiments. As described, it is required in the arithmetic operation performed on the detected data D, according to the embodiments and modified examples of the invention, that the values be computed corresponding to the plurality of detected data D sets.

In the exemplary structures of the embodiments, whether or not to perform the refreshing of the variable R is decided by comparing the acceptable value B to the difference $\Delta F$ between the spatial frequency F and the optimal value F0. However, this decision thereof may also be decided, in accordance with whether or not the spatial frequency F computed by the CPU 41 is within the prescribed range. In other words, it is required, according to the embodiments and modified examples of the invention, that the variable R be refreshed corresponding to the values computed by the prescribed arithmetic operations (arithmetic operations for computing spatial frequency F in the embodiments).

Third Modified Example

In the exemplary structures of the embodiments, the corrected value A is specified based on the table TBL in the step Sa10 in FIG. 4 or the step Sb10 in FIG. 7. However, the manner of computing the corrected value A is arbitral. For instance, the corrected value A may also be computed by performing the prescribed arithmetic operation to the spatial frequency F or the difference $\Delta F$ computed based on the detected data D. In other words, it is required, according to the embodiments and modified examples of the invention, that the variable R be refreshed corresponding to the operational value computed from the detected data D, and the manner of specifying the value after refreshing it is arbitral.

Forth Modified Example

In the exemplary structures of the embodiments, the detected signal Sd that corresponds to the distance from the object's surface is generated by detecting the electric potential of the connecting point N of the detection capacitor Cd and the reference capacitor Cref. However, the configuration for generating this detected signal Sd may be modified arbitrarily. Another exemplary configuration may be to install a light-emitting element that emit light beam to the object (for instance, light emitting diode, or LED) and a light-receiving element that receives the reflected light from the object's surface (for instance, charge coupled device, or CCD) to the sensor circuit U, so that the light-receiving element generates the detected signal Sd which the level thereof corresponds to the amount of received light. In other words, a configuration that optically reads the surface of the object may also be included. That is to say, it is required, according to the embodiments and modified examples of the invention, that a means (sensor circuit) to generate the detected signal that corresponds to the distance to the object be provided, and it does not matter whether the manner thereof is electrical or optical.

Fifth Modified Example

In the exemplary structures of the embodiments, the ROM 42, in which programs executed by the CPU 41 and various data sets used upon their execution, is mounted to the detecting device 100. However, these programs and data may also be supplied externally to the detecting device 100. Moreover, the CPU 41 may be an arithmetic logical device that conducts processing, either synchronously or asynchronously to the clocks.

Sixth Modified Example

The detecting device, according to the embodiments of the invention, is preferably employed as an authentication device for authenticating (confirming) the credential of a user in a specific process upon the request thereof. This authentication device is provided with, for instance, in addition to the detecting device 100 according to the first embodiment, a means to execute an authentication process (for example, the exemplary process indicated in FIG. 8), based on the detected data D output from the detecting device 100. Typical examples of the authentication device include: a device that conducts the authentication prior to the electronic commerce, and a device that conducts the authentication prior to a booting of a computer. If the CPU 41 can conduct this type of the authentication, then this makes it possible to mount the authentication device on various types of card mediums, such as: integrated circuit card, cashing card, credit card, identification card.

The entire disclosure of Japanese Patent Application No. 2005-094783, filed Mar. 29, 2005 is expressly incorporated by reference herein.

What is claimed is:

1. A detecting device comprising:
multiple sensors composed with a plurality of sensor circuits arrayed on a plane, each of which generates at least one detected signal that corresponds to a distance from a surface of an object;
a selector circuit that selects each of the sensor circuits and outputs the detected signal from each of the sensor circuits;
a storage that stores digital data of a reference value;
a digital-to-analog converter circuit that generates a reference signal that corresponds to a level of the reference value from the digital data stored in the storage;
a generation circuit that generates, per each of the sensor circuits, in sequence, detected data according to a relationship of levels between the detected signal output from each of the sensor circuits selected by the selector circuit, and the reference signal generated by the digital-to-analog converter circuit;
an arithmetic circuit that conducts a prescribed operation with a plurality of detected data sets generated by the generation circuit;
a refresh circuit that refreshes the digital data stored in the storage, based on an operational value calculated by the arithmetic circuit; and
an output circuit that conducts an output process, corresponding to the detected data generated by the generation circuit.

2. The detecting device according to claim 1, further comprising a specifying unit which specifies, to the selector circuit, an area which is a target for selection out of the multiple sensors by the selector circuit, and conducts a first process for specifying a first area in the multiple sensors, and a second process for specifying a second area which is larger than the first area;
wherein the selector circuit selects each of the sensor circuits that belong to the area specified by the specifying unit, and lets the detected signal perform output from the sensor circuits; and
wherein the output circuit conducts the output process, corresponding to the detected data generated by the generation circuit upon the execution of the second process, while not conducting the output process for the detected data generated by the generation circuit upon the execution of the first process.

3. The detecting device according to claim 2, wherein the arithmetic circuit conducts the prescribed arithmetic operation with the detected data generated by the generation circuit upon the execution of the first process, while not conducting the prescribed arithmetic operation with the detected data generated by the generation circuit upon the execution of the second process.

4. The detecting device according to claim 2, wherein the first process is conducted multiple times, and the first area specified in one of the iterations of the first process is different from the first area specified in another iteration of the first process.

5. The detecting device according to claim 1, wherein the arithmetic circuit conducts the prescribed arithmetic operation with the detected data that corresponds to each of the sensor circuits that belong to a specific area, out of the plurality of detected data sets generated corresponding to the detected signals from the all the sensor circuits that compose the multiple sensors.

6. The detecting device according to claim 5, wherein:
the selector circuit conducts the selection for all the sensor circuits that composes the multiple sensors in a plurality of times, and
the arithmetic circuit changes one area which is to be selected as a target of the prescribed arithmetic operation entailing the selection of one iteration to be different from the another area which is to be selected as a target of the prescribed arithmetic operation entailing the selection of another iteration.

7. The detecting device according to claim 1, wherein the arithmetic circuit calculates a spatial frequency of an image formed with an array of detected data sets that correspond to the sensor circuits, in accordance with an alignment of the sensor circuits in the multiple sensors.

8. The detecting device according to claim 1, wherein:
the generation circuit generates a first-value detected data, if the level of the detected signal is higher than that of the reference signal, and a second-value detected data, if the level of the detected signal is lower than that of the reference signal; and
the arithmetic circuit calculates a ratio between a total number of the first value detected data sets out of the plurality of detected data sets, each of which are generated corresponding to the detected signal from each of the sensor circuits, and a total number of the second value detected data sets.

9. The detecting device according to claim 1, wherein the output circuit outputs the detected data generated by the generation circuit from an output terminal.

10. The detecting device according to claim 1, wherein the output circuit includes a characteristic extraction unit that generates a profile data indicating the form of a characteristic point of the shape on the surface of the object, from the detected data generated by the generation circuit; and outputs the profile data generated by the characteristic extraction unit from the output terminal.

11. The detecting device according to claim 1, further comprising a profile storage which stores registered profile data that indicates the form of the characteristic point of the shape on the surface of the prescribed object;
wherein the output circuit includes:
the characteristic extraction unit that generates the profile data that indicates the form of the characteristic point of the shape on the surface of the object, from the detected data generated by the generation circuit; and
a correlation calculation unit that calculates a correlation value between a shape of a surface of an object which is a detection target for the detecting device and the shape of the surface of the prescribed object, by comparing the profile data generated by the characteristic extraction unit and the registered profile data stored in the profile storage; and wherein the output circuit outputs the correlation value calculated by correlation calculation unit from the output terminal.

12. The detecting device according to claim 1, further comprising the profile storage which stores the registered profile data that indicates the form of the characteristic point of the shape on the surface of the object;

wherein the output circuit includes:

the characteristic extraction unit that generates the profile data that indicates the form of the characteristic point of the shape on the surface of the object, from the detected data generated by the generation circuit;

a correlation calculation unit that calculates a correlation value between a shape of a surface of an object which is a detection target for the detecting device and the shape of the surface of the prescribed object, by comparing the profile data generated by the characteristic extraction unit and the registered profile data stored in the profile storage; and a correlation-decision unit that compares the correlation value calculated by the correlation calculation unit, to a threshold value; and wherein the output circuit outputs the correlation value calculated by correlation calculation unit from the output terminal.

13. The detection device according to claim 1, wherein components of the detecting device that include at least the digital-to-analog converter circuit are composed with a circuit that includes a thin film transistor formed on a surface of a substrate.

14. An authentication device comprising:

the detecting device that detects a human fingerprint, according to claim 1; and an authentication section for conducting an authentication process based on information output from the output circuit of the detecting device.

* * * * *